（12）United States Patent
Zlotnik et al.

(10) Patent No.: US 10,919,734 B2
(45) Date of Patent: Feb. 16, 2021

(54) SELF-RELEASE MECHANISM FOR PARCEL DELIVERY

(71) Applicant: Flytrex Aviation Ltd., Tel Aviv (IL)

(72) Inventors: Vadim Zlotnik, Ramat Gan (IL); Yoav Dori, Tel Aviv (IL)

(73) Assignee: Flytrex Aviation Ltd., Tel Aviv (IL)

( * ) Notice: Subject to any disclaimer, the term of this patent is extended or adjusted under 35 U.S.C. 154(b) by 0 days.

(21) Appl. No.: 16/568,966

(22) Filed: Sep. 12, 2019

(65) Prior Publication Data

US 2020/0140237 A1 May 7, 2020

Related U.S. Application Data

(60) Provisional application No. 62/755,779, filed on Nov. 5, 2018.

(51) Int. Cl.
*B66C 1/38* (2006.01)
*B64D 1/22* (2006.01)

(52) U.S. Cl.
CPC . *B66C 1/38* (2013.01); *B64D 1/22* (2013.01)

(58) Field of Classification Search
CPC .. B66C 1/38; B64D 1/22; A01K 83/00; A45F 5/10; A45F 5/0006; A45F 5/102; A47G 29/08; A47G 29/083; B65G 7/12; A41D 27/22
USPC ........ 248/690, 301, 304, 914; 294/170, 142; 223/1, 85; 43/42.39, 43.16, 44.81
See application file for complete search history.

(56) References Cited

U.S. PATENT DOCUMENTS

| 4,944,480 A * | 7/1990 | Jarrett ................ A47G 25/0607 |
| | | 248/304 |
| 6,530,548 B2 * | 3/2003 | Pizzirusso ............ A47G 29/083 |
| | | 248/304 |
| 7,617,629 B2 * | 11/2009 | Lizardo .................. A01K 83/06 |
| | | 43/43.16 |

(Continued)

FOREIGN PATENT DOCUMENTS

| CA | 2762546 A1 * | 6/2013 | ............. A01K 91/04 |
| CN | 203095407 U | 7/2013 | |

(Continued)

OTHER PUBLICATIONS

"How to Build an Awesome Trebuchet", Nov. 17, 2012, http://wildernessarena.com/supplies/weapons/how-to-build-a-trebuchet-catapult-offense-defense.

*Primary Examiner* — Stephen A Vu
(74) *Attorney, Agent, or Firm* — M&B IP Analysts, LLC (57) ABSTRACT

A self-release mechanism. The self-release mechanism includes a counter-weight, wherein the counter-weight is located on a first end of the self-release mechanism; a shaft having a top portion and a bottom portion, wherein the top portion of the shaft is coupled to the counter-weight, wherein the shaft defines a perforation, wherein the perforation is adapted to receive a cord; and a hook including a hook bend, wherein the hook is located on a second end of the self-release mechanism, wherein the hook is coupled to the bottom portion of the shaft, wherein the self-release mechanism moves to a first position when a tension is exerted on the self-release mechanism due to gravity caused by coupling of the hook to a payload via the hook bend, wherein the self-release mechanism moves to a second position when the exerted tension is released.

10 Claims, 9 Drawing Sheets

(56) References Cited

U.S. PATENT DOCUMENTS

| | | | | |
|---|---|---|---|---|
| 8,468,738 B1* | 6/2013 | Long | ............... | A01K 85/00 |
| | | | | 43/43.16 |
| 9,174,733 B1* | 11/2015 | Burgess | ............... | B64D 1/12 |
| 2016/0330944 A1* | 11/2016 | Miller | ............... | A01K 91/06 |
| 2017/0086435 A1* | 3/2017 | Locker | ............... | A01K 83/00 |
| 2017/0259941 A1 | 9/2017 | Briggs, IV et al. | | |

FOREIGN PATENT DOCUMENTS

| | | | | |
|---|---|---|---|---|
| CN | 207072759 U | 3/2018 | | |
| WO | WO-2012027771 A1 * | 3/2012 | ............. | A01K 83/06 |

* cited by examiner

SELF-RELEASE MECHANISM FOR PARCEL DELIVERY

CROSS-REFERENCE TO RELATED APPLICATIONS

This application claims the benefit of U.S. Provisional Application No. 62/755,779 filed on Nov. 5, 2018, the contents of which are hereby incorporated by reference.

TECHNICAL FIELD

The present disclosure relates generally to aerial parcel delivery, and more specifically to quick-release mechanisms for aerial parcel delivery.

BACKGROUND

As aerial parcel delivery becomes more popular, so do solutions for securing aerial parcel delivery. For example, unmanned aerial vehicles such as drones have become more popular for delivering parcels, so techniques for protecting drones and/or the parcels they deliver are desirable.

One such technique for securing drones and/or parcels may be to land a drone near a person so the person can remove the parcel from the drone. However, this technique requires landing a somewhat large drone close to civilians who may not strictly adhere to safety precautions and regulations, thereby increasing the risk of injury.

Another technique for securing drones and/or parcels includes lowering parcels from a drone via a cable using a winch. However, this technique presents challenges in complexity of mechanisms since it requires detaching the cable from the parcel automatically. The mechanisms used for existing solutions are expensive and prone to failure. In particular, the more moving parts included in such a mechanism, the higher the likelihood that the mechanism stops working due to failure of moving parts.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a self-release mechanism, comprising: a counter-weight, wherein the counter-weight is located on a first end of the self-release mechanism; a shaft having a top portion and a bottom portion, wherein the top portion of the shaft is coupled to the counter-weight, wherein the shaft defines a perforation, wherein the perforation is adapted to receive a cord; and a hook including a hook bend, wherein the hook is located on a second end of the self-release mechanism, wherein the hook is coupled to the bottom portion of the shaft, wherein the self-release mechanism moves to a first position when a tension is exerted on the self-release mechanism due to gravity caused by coupling of the hook to a payload via the hook bend, wherein the self-release mechanism moves to a second position when the exerted tension is released.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a self-release mechanism for parcel delivery. Specifically, the self-release mechanism is a hook mechanism which may be utilized to, for example, couple a payload (e.g., a parcel such as a package) to an unmanned aerial vehicle (UAV) such as a drone. The self-release mechanism allows the drone to lower the payload while hovering at a location and to disconnect from the payload once the payload is supported by a surface such as the ground.

The self-release mechanism includes a counterweight and a perforation to which a cord may be coupled. In an embodiment, the perforation is along an axis of rotation of the self-release mechanism. The counterweight is located on and end of the self-release mechanism opposite that of a hook of the self-release mechanism such that, when the payload ceases to cause tension on the cord due to gravity (i.e., when the payload is disconnected), the hooks swings around the axis of rotation from a first position to a second position, thereby releasing the package and allowing for retraction of the cord by the drone.

The self-release mechanism according to the disclosed embodiments provides a low complexity mechanical design with few moving parts or interlocking pieces, thereby simplifying manufacturing and maintenance as well as reducing the likelihood of failure.

Figure 1:
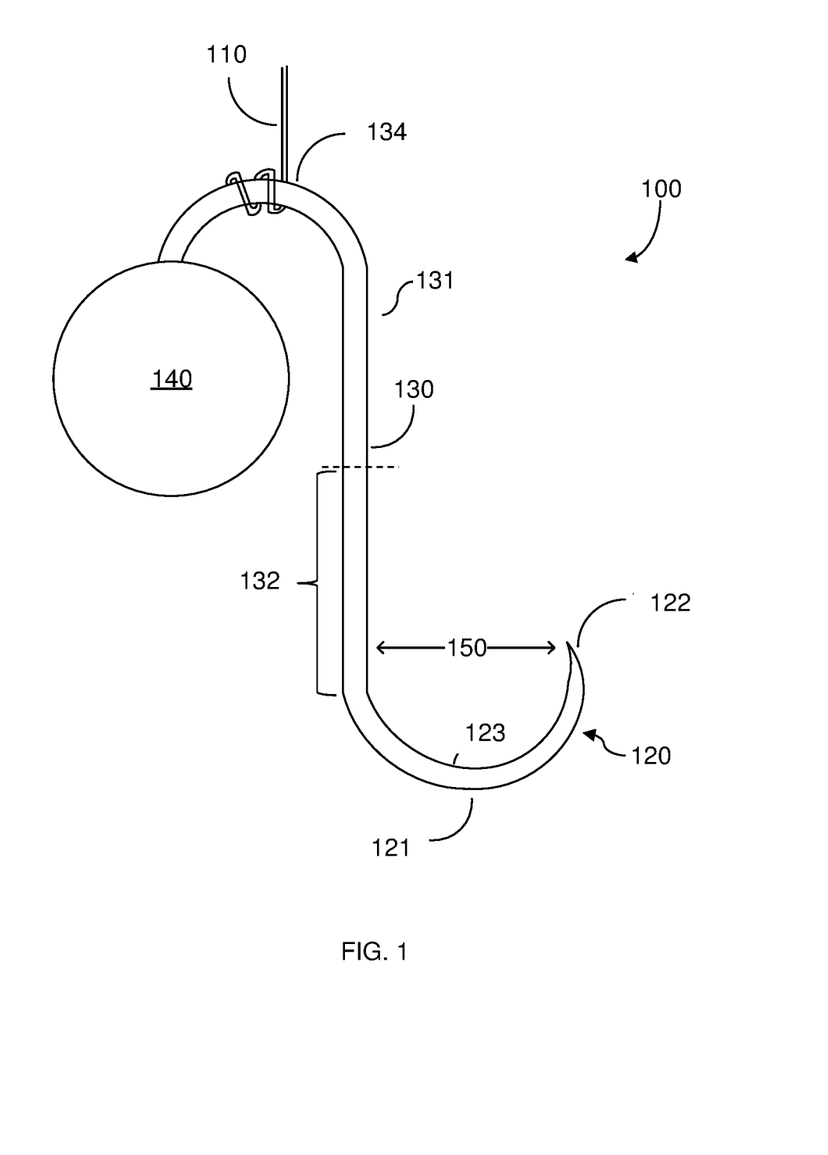
FIG. 1 is a schematic illustration of a self-release mechanism according to an embodiment.

FIG. 1 is an example schematic illustration of a self-release mechanism 100 according to an embodiment. The mechanism 100 includes a hook 120, a shaft 130, and a counterweight 140. The mechanism 100 is designed to allow for attachment to a cord 110. As shown in FIG. 1, the mechanism 100 is vertically oriented. The vertical orientation is relative to, for example, the ground (not shown).

The hook 120 includes a hook bend 121 and comes to a point 122. The bend 121 has a reverse side 123. A gap 150 is defined between the point 122 and the shaft 130 such that the hook 120 can latch onto a payload (not shown in FIG. 1), which would rest at the bottom of the bend 121. The shaft 130 is a relatively straight portion of the hook, having a top portion 131 and a bottom portion 132 such that the bottom portion 132 continues into the bend 121 culminates in the point 122.

Figure 2A:
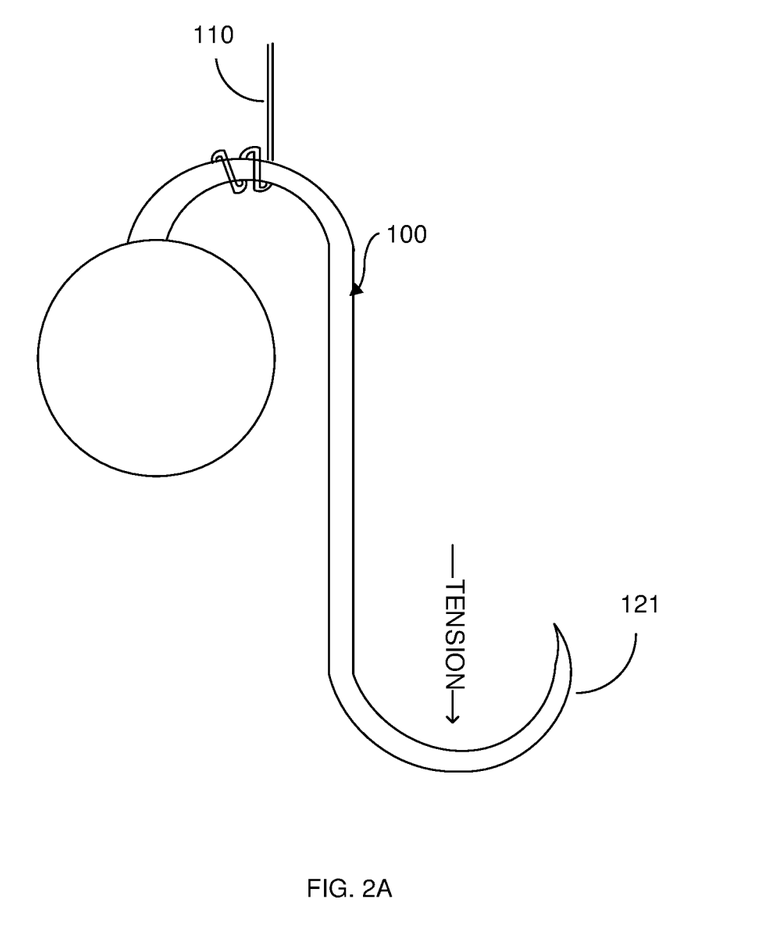
FIGS. 2A-B are schematic illustrations of a self-release mechanism in first and second positions according to an embodiment.
Figure 2B:
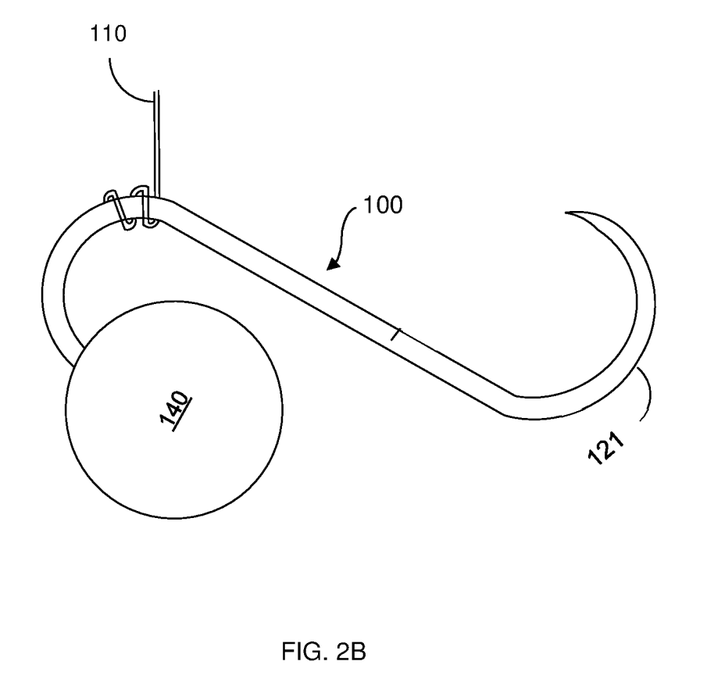

The top portion 131 of the shaft 130 includes an arch 134 which connects to the counterweight 140. The arch 134 allows for connecting the hook 100 to a wire, cord, or other line such as the cord 110, thereby allowing for connecting the mechanism 100 to a parcel (not shown in FIG. 1). The counterweight 140 serves to offset the center of mass of the mechanism 100 so that the mechanism 100 has a first upright position (shown) when held in tension, and a second loose position (not shown in FIG. 1) which allows for rapid disengagement from a parcel due to displacement of the bend 121 related to movement into a second position as illustrated in more detail with respect to FIG. 2 below. The point at which the cord 110 connects with the arch 134 of the mechanism 100 defines an axis of rotation around which the mechanism 100 may rotate to balance out its center of mass.

FIGS. 2A-B are example schematic illustrations of the self-release mechanism 100 in first and second positions according to an embodiment. The mechanism 100 is described with reference to various components having reference numbers shown in FIG. 1. As shown in FIG. 2A, the mechanism 100 is vertically oriented relative to, for example, the ground. As shown in FIG. 2B, the mechanism 100 is not vertically oriented.

The first position (shown in FIG. 2A) occurs when tension is applied on the bend 121 to cause force opposing force caused by the counterweight 140. In other words, the tension on the bend 121, which may be caused by gravity pulling down on a parcel, creates a downward force proportional to the mass of the parcel (i.e., away from the cord 170) that is greater than the force generated by gravity pulling down on the counterweight 140.

When the tension applied to the bend 121 is lessened or otherwise released (i.e., when the parcel is decoupled from the mechanism 100), the mechanism 100 reverts to the second position (shown in FIG. 2B). For example, if a parcel is attached to the mechanism 100 which, in turn, is attached to a cord 110, and lowered by a drone towards the ground, the weight of the parcel causes sufficient tension to counter the force caused by the counterweight 140. When the parcel touches the ground or another support, the parcel no longer exerts a force on the hook 120, thereby causing the mechanism 100 to revert to the second position of FIG. 2B.

Figure 3A:
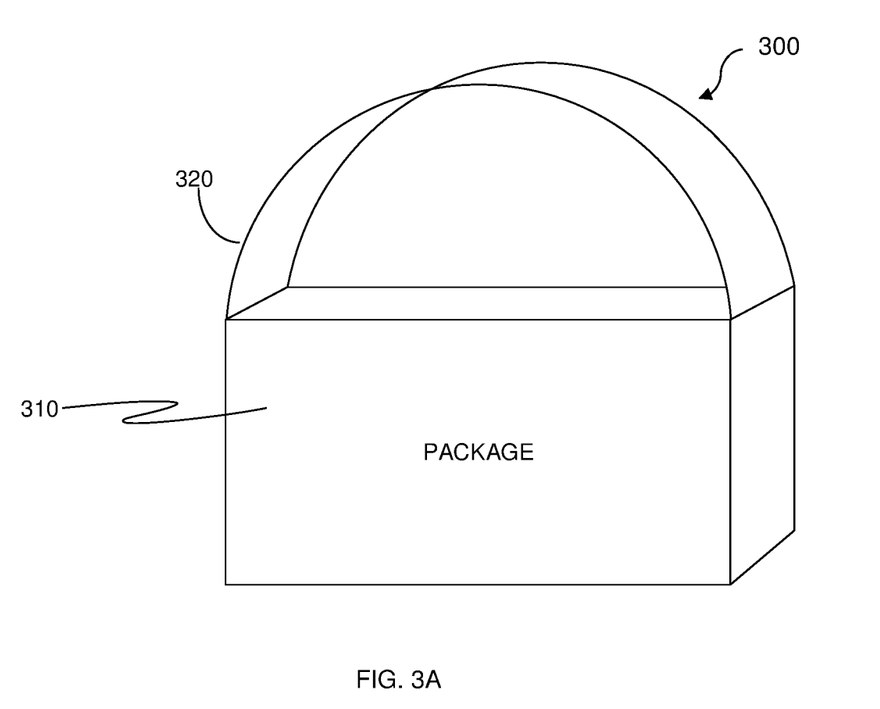
FIGS. 3A-B are schematic illustrations of a parcel and a self-release mechanism according to an embodiment in which the self-release mechanism is attached to a parcel.
Figure 3B:
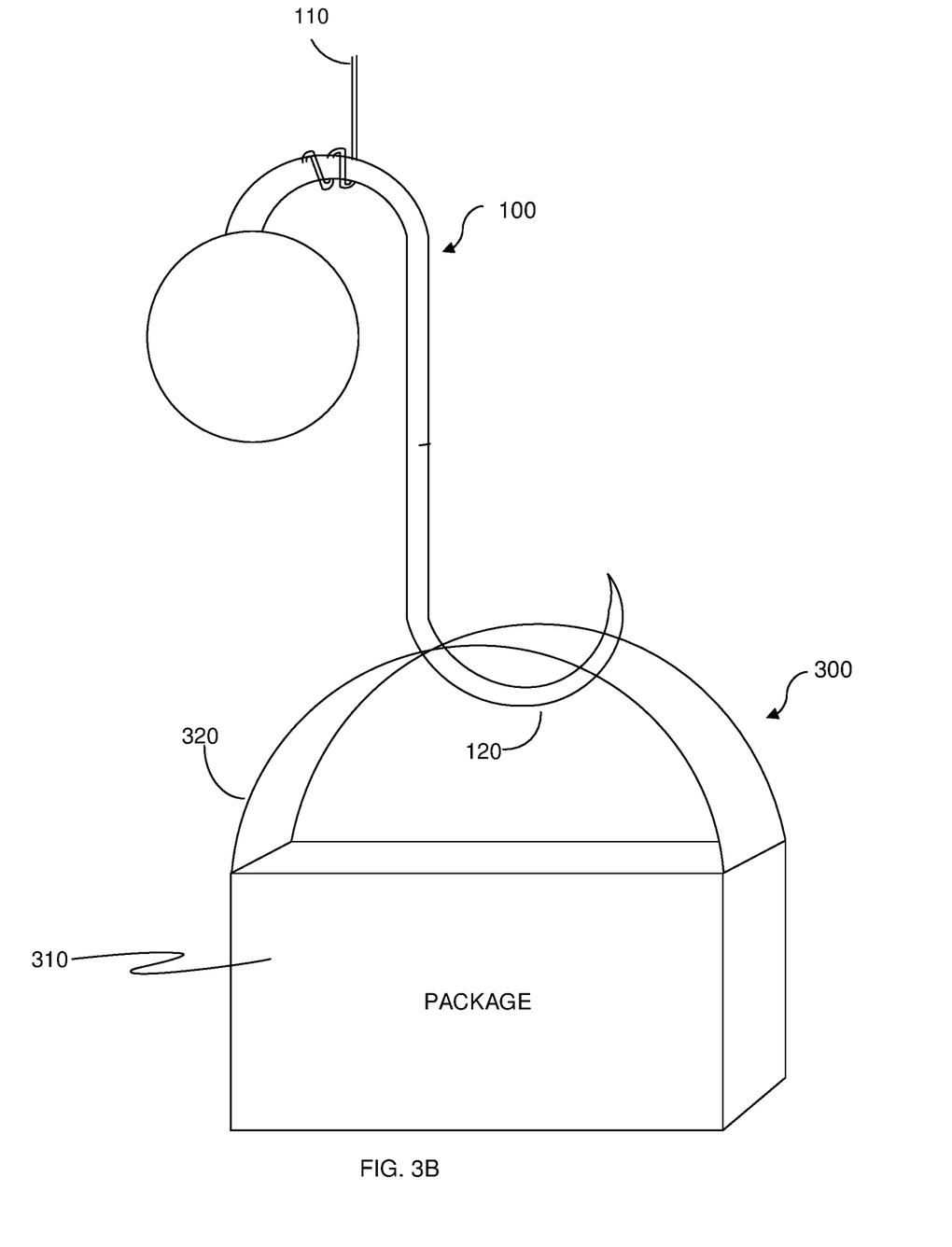

FIGS. 3A-B are example schematic illustrations of a parcel and of attachment of the self-release mechanism 100 according to an embodiment to a parcel, respectively. As shown in FIG. 3A, a parcel such as a package 310 is attached to a ribbon 320. The ribbon 320 allows for coupling with the mechanism 100 and, more specifically, the hook 120.

As shown in FIG. 3B, the package 310 attached to the ribbon 320 couples with the mechanism 100, thereby allowing the package 310 to be lowered by extending the cord 110, for example from a delivery drone (not shown in FIGS. 3A-B). Upon making contact with a support surface such as the ground (not shown), the mass of the package 310 no longer exerts tension on the hook 120, thereby freeing the counterweight 140 to move the mechanism 100 into the second position shown in FIG. 2. In some implementations, the drone may be moved such that the hook 120 will not couple with the ribbon 320 when the drone retracts the cord 110. As a non-limiting example, by defining movement of the drone using an X-Y plane relative to a 3D environment, the drone may move the mechanism 100 and, more specifically, the hook 120, away from the ribbon 320 such that the hook 120 does not come into contact with the ribbon 320 as the cord moves upward due to retraction.

It should be noted that the package 310 shown in FIGS. 3A-B is a rectangular prism, but that other sizes and shapes of parcels may be equally utilized without departing from the disclosed embodiments. Likewise, the ribbon 320 may be any other shape or size, or may not be used (e.g., the mechanism 100 may be coupled to the package 310 directly) without departing from the scope of the disclosure.

Figure 4:
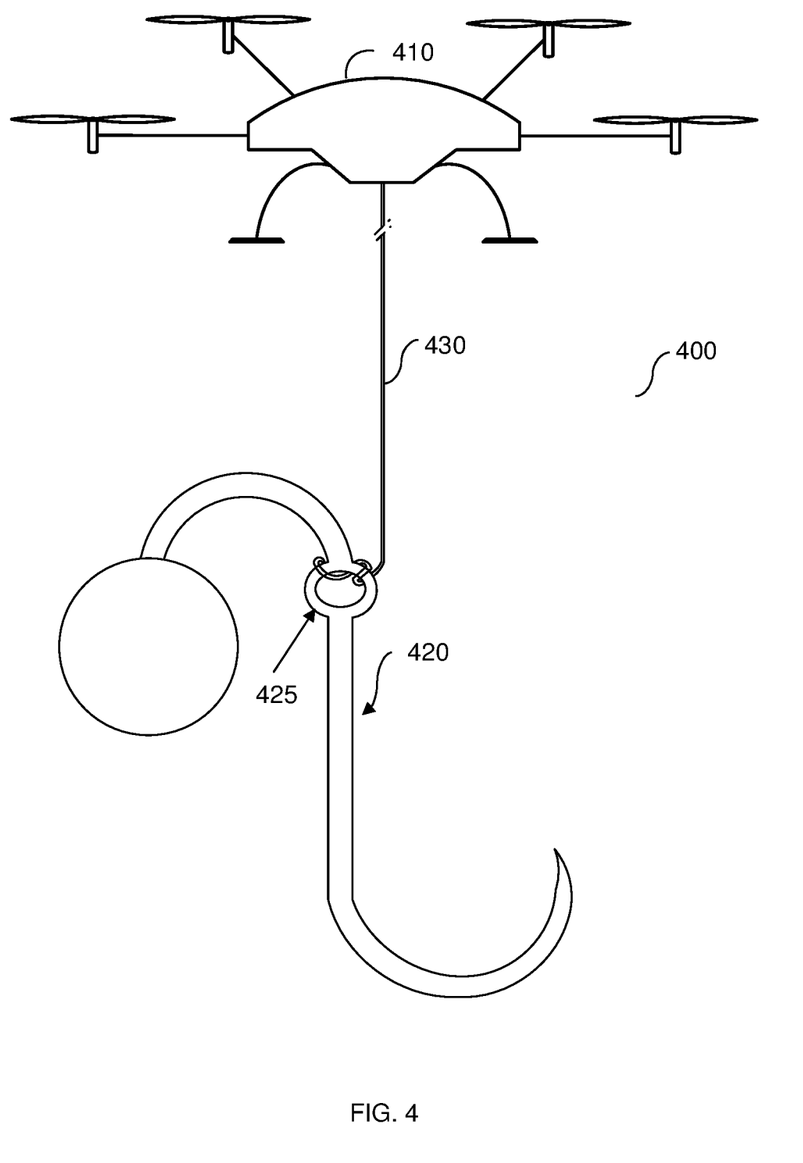
FIG. 4 is a schematic illustration of an unmanned aerial vehicle coupled to a self-release mechanism.

FIG. 4 is an example schematic illustration 400 of an unmanned aerial vehicle (UAV) 410 coupled to a self-release mechanism 420. In an example implementation, the UAV 410 includes a propulsion system, a stabilizing system and a package delivery system (not shown). As a non-limiting example, the propulsion system may be a quadcopter system including four independently motorized propellers which provide lift and thrust according to the power provided to each motor of the propeller. The stabilizing system allows the UAV 410 to remain relatively stationary, also known as hovering. The package delivery system may include a recess (not shown) in the UAV 410, or another mount to attach a package to the UAV 410.

A parcel (not shown in FIG. 4) is attached by coupling the parcel with the mechanism 420. As shown in FIG. 4, the mechanism 420 includes an eyelet 425, which is a perforation along the shaft, to which a cord 430 may be coupled. The cord 430 is coupled on one end to the mechanism 420, and on the other end to a spindle of the package delivery system of the UAV 410. The UAV 410 lowers the package by hovering at a delivery location and performing a controlled (i.e. not free) release of the spindle such that the cord 430 is released at a sufficiently constant velocity. Release velocity may vary depending on the package contents, package weight, other received instructions, and the like.

Figure 5:
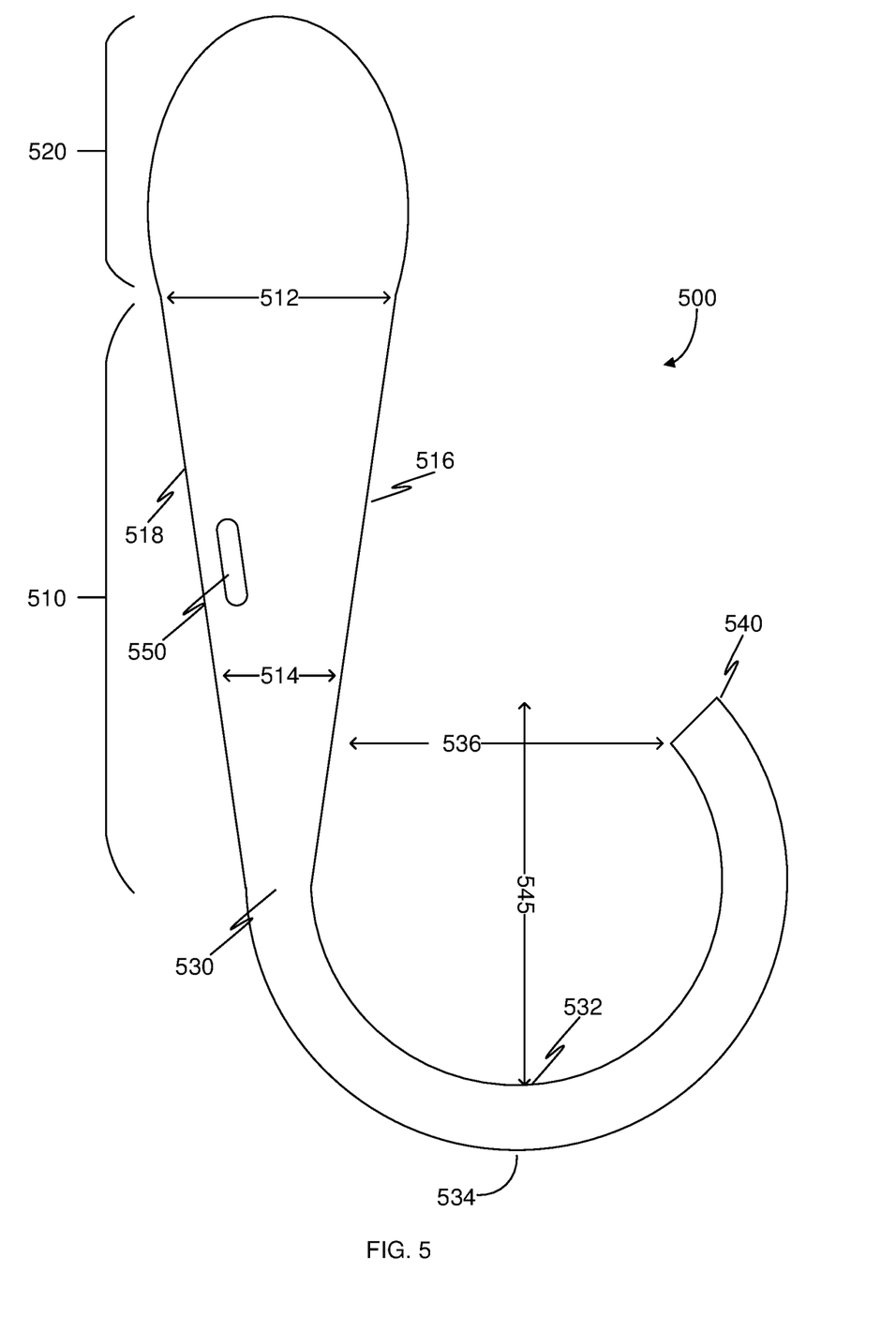
FIG. 5 is a schematic illustration of a self-release mechanism according to another embodiment.

FIG. 5 is a schematic illustration of a self-release mechanism 500 according to another embodiment. In FIG. 5, the self-release mechanism 500 includes a shaft 510, a counterweight 520, and a hook 530. The shaft 510 includes a top portion 512, a bottom portion 514, an internal side 516, and an external side 518.

The shaft 510 begins at the culmination of a weighted portion of the counterweight 520 and tapers to the hook 530 such that the top portion 512 of the shaft 510 is wider than the bottom portion 514 of the shaft 510. The hook 530 begins at the culmination of the shaft 510 and terminates with a point 540. The point 540 is not necessarily a sharp point, but is used merely as an expression to indicate the end of the hook 530.

The point 540 terminates a relative position 545 which is higher than the lowest point on the hook bend, which is defined by an internal point 532 and a corresponding external point 534. In an example implementation, the coupling point for the package rests on the internal point 532. The first position shown in FIG. 5 is defined when the external point 534 is closest to the ground.

A gap 536 is defined between the point 540 and the internal side 516 of the shaft 510. A fastener of a package (not shown in FIG. 5) is inserted into the mechanism 500 through the gap 536 to rest the fastener on the internal point 532. The mechanism 500 further includes a perforation 550 on the shaft 510. The perforation 550 is located between the top portion 512 and the bottom portion 514. In an embodiment, the position of the perforation 550 is closer to the external side 518 than to the internal side 516.

The perforation 550 is adapted to receive a cord (not shown in FIG. 5) to which the mechanism 100 may be coupled. When a force is exerted by the cord, creating tension thereon, the perforation 550 acts as a fixed point around which the self-release hook balances its weight. By positioning the perforation 550 close to the external side 518, the fixed point around which the self-release hook 500 adjusts ensures that the point 540 will face towards the ground, i.e., vertically downward relative to the drone and ground be closer to the ground than at least a portion of the shaft 510. This allows for a simple and rapid release of the package, which does not require additional movement from the drone. Also, release is done automatically once the package touches a firm surface, as this removes the tension on the cord.

In another embodiment, the perforation 550 may be defined in a location closer to the internal side 516 of the shaft 510. In such an embodiment, the mechanism reverts to a position in which the point 540 faces upward, i.e., the point 540 would be closer to a UAV relative to the shaft 510, which would be closer to the ground. This would require additional maneuvering by the drone in order to ensure that point 540 does not snag on the package once the drone is ready to leave the delivery location.

Figure 6A:
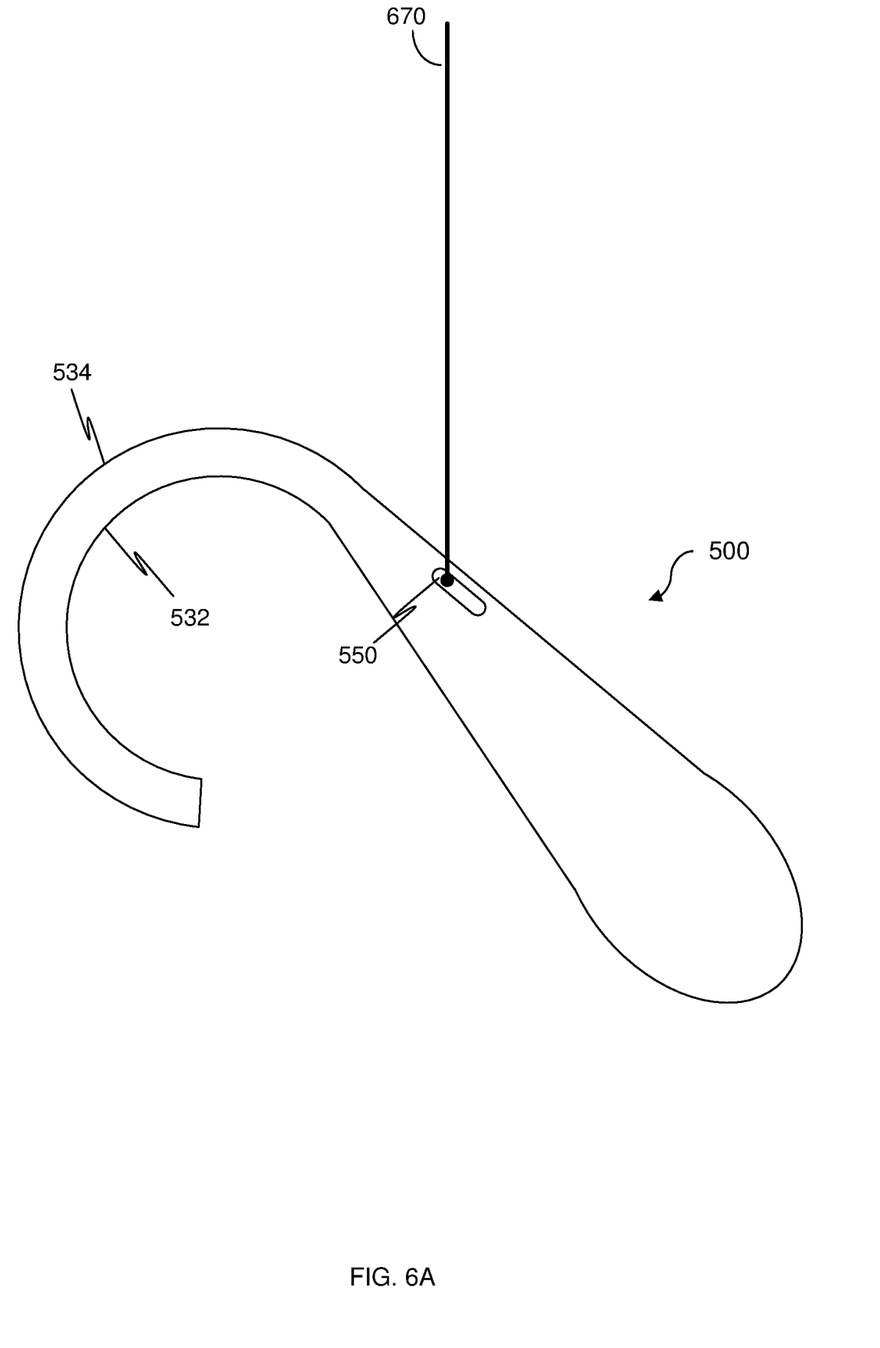
FIGS. 6A-B are schematic illustrations of a self-release mechanism attached to a cord according to two embodiments.
Figure 6B:
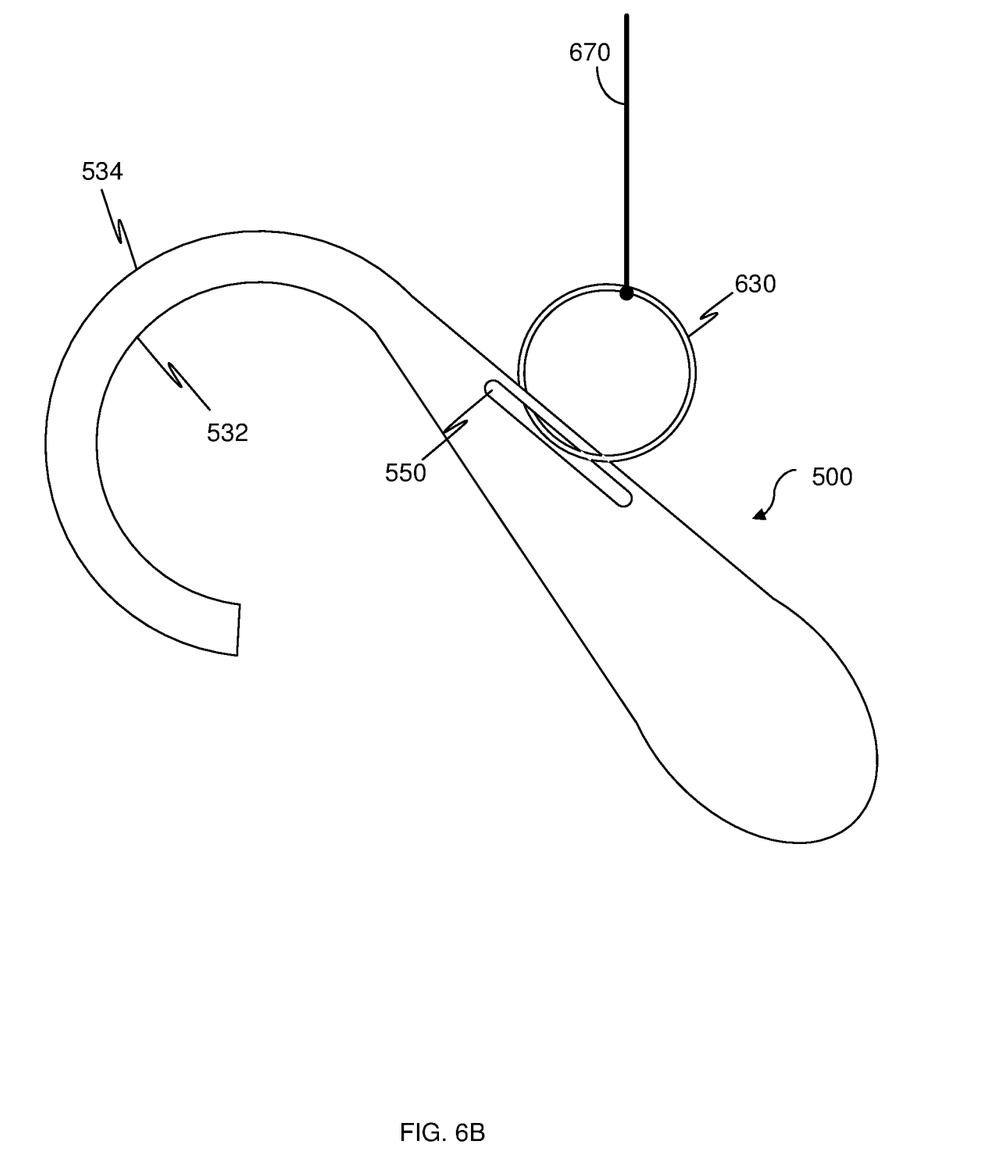

FIGS. 6A-B are example schematic illustrations of the self-release mechanism 500 attached to a cord according to other embodiments. A cord 670 is coupled with the perforation 550, either directly (as shown in FIG. 6A) or indirectly (as shown in FIG. 6B).

The perforation 550 defines an axis around which the mechanism 500 can adjust its position depending on whether or not a weight is affixed to the hook 530. When the weight is released, i.e., the package is supported by a surface, the self-release mechanism will rotate on the axis defined by the perforation 550 into the second position. In one embodiment, in the second position, the external portion 534 is further from the ground than the internal portion 532, to further aid decoupling of the package from the self-release mechanism. In another embodiment, the self-release hook may be orthogonal to the cord 670 such the both the internal and external portions 532 and 534 are roughly the same distance from the supporting surface (e.g. from the ground). However, the further the external portion 534 is from the ground, the easier it should generally be to release the hook from the package, allowing the drone to continue its plan, or execute some other instruction.

In an embodiment, the cord 670 may be coupled via an intermediate mechanism, such as another cord of a different material, a ring, and the like. An example of such an embodiment is shown in FIG. 6B, where the cord 670 is coupled via a ring 630.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A self-release mechanism, comprising:
    a counter-weight, wherein the counter-weight is located on a first end of the self-release mechanism;
    a shaft having a top portion and a bottom portion, wherein the top portion of the shaft is coupled to the counter-weight, wherein the shaft defines a perforation, wherein the perforation is adapted to receive a cord; and
    a hook including a hook bend, wherein the hook is located on a second end of the self-release mechanism, wherein the hook is coupled to the bottom portion of the shaft, wherein the counter-weight is adapted to offset the center of mass of the self-release mechanism such that the self-release mechanism moves to a first upright position when a tension is exerted on the self-release mechanism due to gravity caused by coupling of the hook to a payload via the hook bend that is greater than the force generated by gravity pulling down on the counterweight and such that the self-release mechanism moves to a second position when the exerted tension is released.

2. The self-release mechanism of claim 1, wherein the perforation is along an axis of rotation of the self-release mechanism, wherein the hook swings around the axis of rotation when the exerted tension is released such that the hook moves from the first position to the second position.

3. The self-release mechanism of claim 1, wherein the top portion of the shaft further includes an arch, wherein the arch is coupled to the counter-weight.

4. The self-release mechanism of claim 1, wherein the hook bend terminates with an end point, wherein a gap is defined between the end point of the hook bend and the shaft.

5. The self-release mechanism of claim 1, further comprising:
    the cord, wherein the cord is at least partially disposed in the perforation of the shaft, wherein the hook is decoupled from the payload via movement of the cord.

6. The self-release mechanism of claim 5, wherein the cord is coupled to an aerial vehicle, wherein the payload is lowered toward a landing surface due to release of at least a portion of the cord from the aerial vehicle.

7. The self-release mechanism of claim 1, wherein the shaft tapers from the top portion to the bottom portion.

8. The self-release mechanism of claim 1, wherein the self-release mechanism is vertically oriented relative to the ground when in the first position.

9. The self-release mechanism of claim 8, wherein the counterweight is disposed above the hook relative to the ground when the self-release mechanism is in the first position.

10. The self-release mechanism of claim 9, wherein at least a portion of the counterweight is disposed below at least a portion of the hook relative to the ground when the self-release mechanism is in the second position.

* * * * *